United States Patent

White

[15] 3,700,331
[45] Oct. 24, 1972

[54] SPECTROMETER WITH ROTARY SCANNING DISC AND METHOD OF SPECTROSCOPIC ANALYSIS

[72] Inventor: Peter G. White, Torrance, Calif.
[73] Assignee: TRW Inc., Redondo Beach, Calif.
[22] Filed: Dec. 29, 1969
[21] Appl. No.: 888,385

[52] U.S. Cl. ..........................356/83, 356/96, 356/99
[51] Int. Cl. ...........................G01j 3/42, G01j 3/12
[58] Field of Search .........350/273, 275; 356/74, 101

[56] References Cited

UNITED STATES PATENTS

| | | | |
|---|---|---|---|
| 2,010,307 | 8/1935 | Leishman | 350/273 |
| 2,750,836 | 6/1956 | Fastie | 356/100 |
| 2,823,577 | 2/1958 | Machler | 356/86 |
| 2,946,879 | 7/1960 | Powers | 356/99 |
| 2,995,973 | 8/1961 | Barnes et al. | 356/99 |
| 3,460,892 | 8/1969 | Dolin | 356/99 |

Primary Examiner—Ronald L. Wibert
Assistant Examiner—V. P. McGraw
Attorney—Daniel T. Anderson, Donald R. Nyhagen and Jerry A. Dinardo

[57] ABSTRACT

A spectrometer and method of spectroscopic analysis for providing spectral data concerning a scene by collecting and collimating radiation from the scene to provide a radiation beam dispersing the radiation of the beam into a spectrum, forming a focused image of the spectrum, scanning the spectrum image in rapid succession by multiple narrow radiation receiving areas, and generating an electrical output representing the radiant flux incident on each area during its relative scanning movement along the image. The spectrometer may be equipped with means for mounting radiation filters over selected radiation receiving areas to provide information concerning selected characteristics, such as relative polarization, of the radiation from the spectrum image and for mounting narrow band-pass calibration filters over alternate radiation receiving area to permit calibration of the spectral data obtained from the scene.

11 Claims, 5 Drawing Figures

Patented Oct. 24, 1972
3,700,331
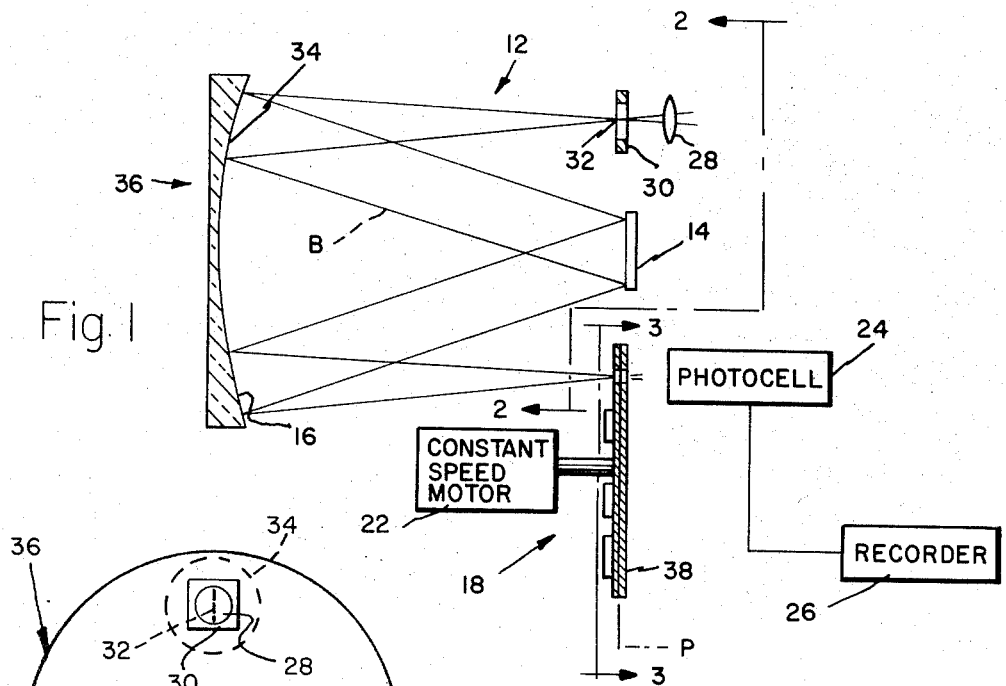
Fig. 1
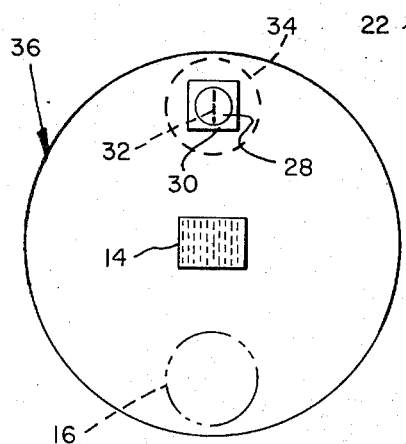
Fig. 2
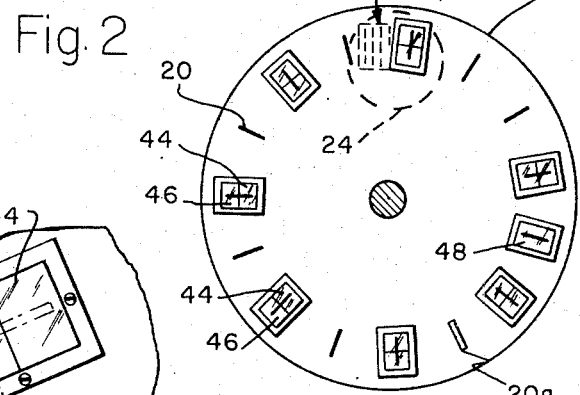
Fig. 3
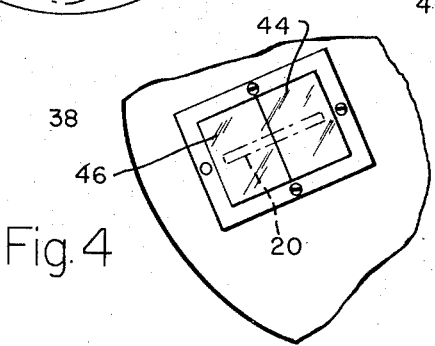
Fig. 4
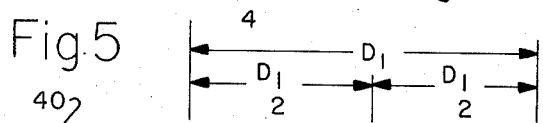
Fig. 5
Peter G. White
INVENTOR.
BY
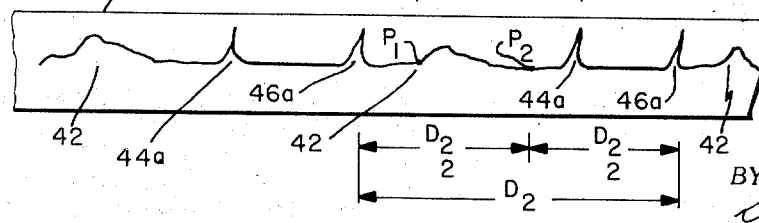
ATTORNEY 3,700,331

SPECTROMETER WITH ROTARY SCANNING DISC AND METHOD OF SPECTROSCOPIC ANALYSIS

BACKGROUND OF THE INVENTION

1. Field of the Invention

This invention relates generally to the field of spectroscopy and more particularly to a novel spectrometer and method of spectroscopic analysis.

2. Prior Art

As will become evident from the ensuring description, the spectrometer and spectroscopic method of the invention are capable of varied useful applications. However, the invention is primarily concerned with and will be disclosed in relation to measurement, from an aircraft or spacecraft, of small differences in the spectral characteristics of radiation flux reflected from a large body of water.

In recent years, there has been a steadily growing interest in the nature and measurement of the color of the world's oceans. This interest has been stimulated by extensive investigations which have been carried out at various oceanographic institutions. In recent years, the opportunity to make measurements of the spectral characteristics of ocean waters from space has become a real possibility which has added impetus to ocean color mapping applications.

Few characteristics of the ocean can be measured remotely from an aircraft or spacecraft, and those characteristics which can be so measured, should be investigated fully to determine their usefulness to the fisheries industry, oceanographers, maritime transport, marine biologists, meteorolgists, and others. The characteristics which are amenable to such remote measurements are sea state, surface temperature, and the color of spectral characteristics of the upper layers of the ocean. These spectral characteristics can define such phenomena as concentration of water pollution and phytoplankton, and shown the boundaries of areas of upwelling.

SUMMARY OF THE INVENTION

The present invention provides a spectrometer and a method of spectroscopic analysis which are ideally suited to the ocean color mapping application discussed above. As noted earlier, however, and as will become evident from the ensuing description, the present spectrometer and spectroscopic method are not limited in usefulness to this particular application.

The spectrometer of the invention is equipped with beam forming means for collecting and collimating radiation from a scene, such as ocean water, to provide a beam of radiation from the scene. This radiation beam is transmitted to a dispersion means, such as a diffraction grating, for dispersing the radiation of the beam into a spectrum which is then formed into a focused spectral image. Means are provided for scanning this spectral image in rapid succession by a number of narrow radiation receiving areas and generating an electrical signal representing the radiant flux incident on each area from the image during relative scanning movement of the respective area along the image. The successive signals thus generated in response to scanning of the spectral image by the successive radiation receiving areas represent the spectral characteristics of the radiation from the scene being analyzed. In the particular ocean color mapping application referred to above, the spectrometer is installed in an aircraft or spacecraft which follows a selected flight path over the ocean. The electrical output from the spectrometer provides continuous spectral information concerning the varying radiation flux from the ocean water along this flight path. This electrical output may be recorded in any convenient manner for subsequent analysis.

In a particular embodiment of the invention selected for illustration, the radiation receiving areas that scan the spectrum image are radial slits arranged in a concentric circular row on a scanning disc which is otherwise opaque to the radiation being analyzed and is driven in rotation on an axis passing through the center of the slit row. The spectrum image is focused in the plane of the slits in a manner such that the image extends tangentially to the slit row. Accordingly, during rotation of the disc, the slits undergo lateral scanning movement in succession along the spectral image from one end to the other. Mounted behind the disc to receive radiation from the spectrum image through each slit during its scanning movement along the image is a radiation detector, such as a photomultiplier. The output from this photomultiplier, therefore, is an electrical signal representing the radiant flux from the spectral image which passes through each slit during its scanning movement along the image.

According to one unique feature of the invention, narrow bandpass interference filters may be mounted over alternate slits of the scanning disc to provide calibration information for calibrating the spectral data obtained from the scene being analyzed. In the disclosed invention embodiment, for example, these calibration filers are red and blue interference filters which are mounted over alternate slits in the scanning disc in a manner such that each filter covers approximately one half the disc. The filters produce spikes in the electrical signal output from the spectrometer which can be used to spectrally calibrate the data obtained from the instrument.

According to another feature of the invention, the scanning disc may be provided with means for mounting selected radiation filters over at least some of the remaining slits in the disc to provide information concerning selected characteristics of the radiation in the spectrum image. For example, polarizing filters may be used to give information concerning the relative polarization of the radiation.

BRIEF DESCRIPTION ON THE DRAWINGS

In the drawings:

FIG. 1 diagrammatically illustrates a spectrometer according to the invention;
FIG. 2 is a view taken on line 2—2 of FIG. 1;
FIG. 3 is a view taken on line 3—3 in FIG. 1;
FIG. 4 is an enlargement of area 4—4 in FIG. 3; and
FIG. 5 illustrates a spectral data record produced by the instrument.

DESCRIPTION OF THE PREFERRED EMBODIMENTS

The drawings illustrate a spectrometer 10 according to the information for providing spectral information concerning a scene, such as ocean water. The spectrometer is equipped with beam forming means 12 for collecting and collimating into a beam B radiation from the scene. Located in the path of the beam B are dispersion means 14 for dispersing the radiation of the beam into a spectrum. This spectrum is transmitted to imaging means 16 which form the spectrum into a focused image I within an image plane P. The spectral image is scanned by scanning means 18. Scanning means 18 includes a number of spaced radiation receiving areas 20 of relatively narrow width compared to the length of the spectrum image, and means 22 for effecting relative scanning movement of the spectrum image and the radiation receiving areas in a manner to cause lengthwise scanning of the image by the areas in rapid succession. Associated with the scanning means 18 are radiation sensing means 24 for providing an electrical signal representing the radiation incident on each radiation receiving area 20 during its relative scanning movement along the spectrum image.

During operation of the spectrometer 10, the scanning means 18 are operated to cause relative scanning movement of the radiation receiving area 20 along the spectral image I in rapid succession. The radiation sensing means 24 generates an electrical output signal representing the varying radiation from the spectrum image incident on each area during its relative scanning movement along the spectrum image. The output from the radiation sensing means, therefore, is effectively a succession of periodic electrical signals representing the radiation incident on the successive radiation receiving areas as they scan the spectrum image. The signal output from the sensing means is fed to a suitable recorder 26, such as a magnetic recorder or strip-chart recorder, for recording the signal output in a form which may be subsequently used for analyzing the spectral data obtained from the scene being analyzed.

Referring in greater detail to the particular embodiment of the invention selected for illustration, the beam forming means 12 comprise an objective lens 28 for collecting radiation from the scene. Located behind and in a focal plane of this lens is a mask 30 which is opaque to the radiation and is formed with a radiation transparent entrance slit 32 on the optic axis of the lens. Lens 28 forms an image of the scene in the plane of the entrance slit 32. The beam forming means 12 further comprise optical means 34 on the axis of lens 28 and slit 32 which receives and collimates the radiation from the image and transmits the incident radiation, as the radiation beam B, to the dispersion means 14. In the particular inventive embodiment illustrated, the optical collimating means 34 comprises a portion of a spherical mirror 36, another portion of which comprises the imaging means 16. The particular dispersion means 14 shown is a diffraction grating located on and in a plane normal to the optic axis of the mirror 36. The optic axis of the objective lens 28 and entrance slit 32 parallels and is spaced laterally from the optic axis of the mirror, as shown, in a manner such that radiation from the scene which enters the spectrometer through the lens is reflected from the surface portion 34 of the mirror to the diffraction grating 14. This grating disperses the radiation of the collimated beam B into a spectrum. This spectrum is reflected to the surface portion 16 of the mirror 36 and then back toward the image plane P along an axis parallel to the axes of the objective lens 28 and mirror 36. The surface portion 16 of the mirror brings the spectrum to focus in the image plane to produce in the latter plane the focused spectral image I referred to earlier.

The spectrum image scanning means 18 of the illustrated spectrometer 10 comprises a rotary scanning disc 38 which is opaque to the radiation of the spectrum image I. This disc is located in the image plane P and has its central rotation axis laterally spaced from the optic axis along which the spectrum image is transmitted from the mirror 36 to the image plane. The disc projects radially across the latter axis so that the spectrum image is formed on the disc at a position radially spaced from its rotation axis. The scanning driver 22 is a constant speed motor, such as a synchronous motor, which is coupled to the scanning disc 38 to drive the latter in rotation on its central axis. Formed in the disc are a number of radial slits which are transparent to the radiation of the spectrum image I and constitute the radiation receiving areas 20. Radial slits 20 are arranged in a circular row concentric with the central rotation axis of the disc 38 and are uniformly circumferentially spaced about the disc. As will appear from the ensuing description, the scanning disc may contain any number of slits providing that the slits are so spaced that the spectrum image is never scanned by more than one slit at a time. The scanning disc of a typical spectrometer according to the invention may contain 15 equally spaced slits.

The entrance slit 32, diffraction grating 14, and mirror 36 are so arranged relative to the scanning disc 38 that the spectral image I is formed in the plane of an in tangential relation to the circular center line of the slits 20. Accordingly, during rotation of the scanning disc 38, the slits 20 undergo lateral scanning movement in succession along the spectrum image from one end to the other. The radial length of each slit is somewhat less than the transverse width of the spectrum image, such that each slit is fully illuminated by the image during the entire scanning movement of the slit from one end of the image to the other.

The radiation sensing means 24 of the illustrated spectrometer comprises a radiation detector or photocell, such as a photomultiplier, mounted behind the disc 38 on an axis normal to the disc and intersecting the circular center line of the slit row. From this description, it will be understood that during rotation of the scanning disc 38, the photocell 24 receives radiation from a narrow band of the spectrum image I, which band progresses along the image from one end to the other. The radiation incident on the photocell and hence the electrical signal fed from the photocell to the recorder 26, thus vary in accordance with the intensity of the successive spectral lines in the image. All but one of the slits 20 have a uniform width substantially less than the length of the spectrum image. In a typical spectrometer according to the invention, for example, the slits are 50 to 75 Angstrom units in width.

Recorder 26 produces a record 40, which is shown to be a strip recording consisting of successive traces 42 each representing the varying radiation intensity along the spectrum image. In the particular ocean color mapping application referred to earlier, the spectrometer is mounted in an aircraft or spacecraft which is flown along a selected flight path passing over an ocean. In this application, the spectrum image, and hence the traces produced by the recorder 26, continuously change along the flight path in accordance with the changing spectral characteristics of the ocean water along the flight path. The record 40 may be subsequently analyzed to determine the spectral characteristics of the ocean water at any point along the flight path and to map the ocean color along the flight path.

Accurate assessment of the spectral data obtained with the present spectrometer requires spectral calibration of the data. This calibration involves both intensity calibration and wavelength calibration. Intensity calibration is accomplished by measuring and/or indicating on the data record 40 produced by the recorder 26 the output signal level of the photocell 24 when the instrument receives radiation from a known source, such as a grey card of known reflectivity illuminated by sunlight. Wavelength calibration is accomplished by providing the data record with indicators or reference points along each successive spectral trace 42 of the record defining positions on the trace corresponding to known wavelengths. Preferably, these reference points are located near the ends of each spectral trace. Assuming linear dispersion of the spectrum by the grating 14, the wavelength corresponding to any point along the spectral trace can then be determined.

In the particular embodiment of the invention illustrated, wavelength calibration is accomplished by mounting narrow bandpass interference filters 44, 46 over alternate slits 20, hereinafter referred to as calibration slits in the scanning disc 38. Each filter covers approximately one-half its respective slit. As each calibration slit scans across the spectrum image I, its interference filters block the passage of radiation through the slit to the photocell 24 until the slit is aligned with the portions of the spectrum image corresponding to the respective transmission frequencies of the filters. The filters then transmit radiation from the spectrum image to the photocells to produce calibration spikes 44a, 46a, respectively, on the data record 40.

From the above discussion, it will be understood that the data record produced by the illustrated spectrometer will resemble the record 40 illustrated in FIG. 5. This data record comprises a succession of spaced spectral traces 42 produced by scanning movement along the spectral image of the intervening slits 20 in the scanning disc 38 between the calibration slits. Within the gaps between the spectral traces are the calibration spikes 44a, 46a produced by scanning movement of the calibration slits along the spectrum image. Since the several slits 20 in the scanning disc 38 are uniformly spaced around the disc and the latter rotates at a constant speed, a reference point $P_1$ half-way between each point of adjacent calibration spikes 44a represents the position, along the intervening spectral trace 42, corresponding to the transmission frequency band of the interference filter 44. Similarly, a point $P_2$ half-way between each pair of adjacent calibration spikes 46a represents the position, along the intervening spectral trace, corresponding to the transmission frequency band of the filter 46. As noted above, the frequency corresponding to any other point of the spectral trace may then be determined from these two reference points. Maximum calibration accuracy is obtained by using interference filters 44, 46, such as red and blue filters, which provide reference points adjacent the extremities of each spectral trace. These filters should have a narrow transmission frequency band on the order of 15 Angstrom units or less.

According to another unique feature of the invention, the scanning disc 38 is equipped with means for mounting additional filters 48 of known radiation transmission characteristics over one or more of the intervening slits 20 between the calibration slits. For example, polarizing filters may be mounted over certain of the intervening slits to provide information concerning the relative polarization of the radiation. In order to determine the spectral trace corresponding to a selected filter 48, one of the intervening slits 20 in the scanning disc 38, i.e., slit 20a in the illustrated disc, may be left uncovered and enlarged relative to the other slits. The periodic spectral traces produced by scanning movement of this enlarged slit along the spectrum image may be readily distinguished from the remaining spectral traces because of their greater magnitude, and the spectral trace produced by a slit covered by a particular filter may be determined by counting.

The operation of the illustrated spectrometer 10 is obvious from the foregoing description. It should be noted here that calibration methods other than those described above, may be employed to spectrally calibrate the data obtained with the present instrument.

What is claimed as new in support of Letters Patent is:

1. A spectrometer for providing spectral information concerning a scene comprising:
   an opaque rotary scanning disc having at least two circumferentially spaced radial scanning slits equally spaced from the rotation axis of the disc;
   beam forming means for collecting and forming into a beam radiation from said scene;
   dispersion means for dispersing the radiation of said beam into a spectrum;
   imaging means for forming a focused image of said spectrum on said disc over the circular path of rotation of said slits with said disc in a manner such that the spectral lines of said image extend generally radially of the disc whereby said slits undergo lateral scanning movement in succession across said image during rotation of said disc;
   radiation sensing means behind said disc for receiving and generating an electrical signal representing the radiation incident on each scanning slit during its scanning movement along said image;
   one of said slits being totally transparent to said radiation, whereby said one slit transmits to said sensing means all of the radiation incident on the latter slit during its scanning movement along said image; and
   narrow band pass filter means across the other slit which transmits radiation only within at least one narrow band of said spectrum.

2. A spectrometer according to claim 1 wherein:
   said filter means comprises a pair of narrow bandpass filters each occupying approximately one-half of the respective slit; and said filters having transmission frequency bands near the ends, respectively, of said radiation spectrum.

3. A spectrometer according to claim 1 wherein:

said scanning disc contains a number of said scanning slits arranged in a circular row centered on said rotation axis and narrow band pass filter means across alternate slits which transmit radiation only within at least said one narrow band of said spectrum; and at least some of the remaining intervening slits being totally transparent to said radiation.

4. A spectrometer according to claim 3 wherein:

each said filter means comprises a pair of narrow band pass filters, each occupying approximately one-half of the respective slit; and said filters having transmission frequency bands near the ends, respectively of said radiation spectrum.

5. A spectrometer according to claim 3 including:

means for mounting over one of said transparent slits a filter having selected radiation transmission characteristics.

6. A spectrometer according to claim 3 wherein:

all of said slits except one are of substantially equal size and said one slit is enlarged.

7. A spectrometer according to claim 6, wherein:

said enlarged slit is a transparent slit.

8. A spectrometer according to claim 1 wherein:

said scanning disc contains a number of said scanning slits arranged in a circular row centered on said rotation axis and narrow band pass filter means across alternate slits which transmit radiation only within at least said one narrow band of said spectrum;

at least some of the remaining intervening slits being totally transparent to said radiation;

each said filter means comprises a pair of narrow bandpass filters each occupying approximately one-half of the respective slit;

said filters having transmission frequency bands near the ends, respectively, of said radiation spectrum;

means for mounting over one of said transparent slits a filter having selected radiation transmission characteristics; and all of said slits except one of said transparent slits are of substantially equal size and said one transparent slit is enlarged.

9. A spectrometer for providing spectral information concerning a scene, comprising:

beam forming means for collecting and collimating into a beam radiation from said scene, said beam forming means including a radiation opaque mask having a radiation transparent entrance slit, and objective lens in front of said slit for producing an image of said scene in the plane of said slit, a concave spherical mirror behind said slit for receiving radiation from said image and reflecting the incident radiation in the form of a collimated radiation beam;

a diffraction grating positioned in front of said mirror on the axis of said beam for dispersing the radiation of said beam into a spectrum and reflecting said spectrum back to said mirror;

said mirror reflecting said spectrum toward an image plane and forming in said plane a focused image of said spectrum;

a rotary radiation opaque scanning disc positioned in said plane and containing a number of radial radiation transparent slits arranged in a circular row concentric with the rotation axis of said disc;

said slits being uniformly spaced along said row and said spectrum image being formed over and in tangential relation to said row, whereby rotation of said disc is effective to cause lateral scanning movement of said slits in rapid succession along said spectrum image;

means for driving said disc in rotation;

radiation sensing means positioned behind said disc opposite said spectrum image for receiving radiation from said image through each slit during its scanning movement along said image;

narrow band pass filter means across alternate slits which transmit radiation only within at least one narrow band of said spectrum;

at least some of the remaining intervening slits being totally transparent to said radiation; and all of said slits except one are of substantially equal size and said one slit is enlarged.

10. A spectrometer according to claim 9 including:

means on said disc for mounting a selected radiation filter over one transparent slit.

11. A spectrometer according to claim 9 wherein:

each filter means comprises a pair of narrow bandpass filters each occupying approximately one-half its respective slit; and said filters having transmission frequency bands near the ends of said radiation spectrum.

* * * * *